Jan. 14, 1958   P. LACHAIZE   2,819,663
PHOTOGRAPHIC CAMERAS

Filed Sept. 9, 1953   8 Sheets-Sheet 3

Jan. 14, 1958  P. LACHAIZE  2,819,663
PHOTOGRAPHIC CAMERAS
Filed Sept. 9, 1953  8 Sheets-Sheet 6

Jan. 14, 1958 P. LACHAIZE 2,819,663
PHOTOGRAPHIC CAMERAS
Filed Sept. 9, 1953 8 Sheets-Sheet 8

United States Patent Office 2,819,663
Patented Jan. 14, 1958

2,819,663

PHOTOGRAPHIC CAMERAS

Paul Lachaize, Tassin-la-demi-lune, France

Application September 9, 1953, Serial No. 379,144

Claims priority, application France September 18, 1952

13 Claims. (Cl. 95—31)

The present invention relates to photographic cameras, and more particularly to roll film magazines for photographic cameras.

In most cameras constructed to use roll film, the length of the film is such that the number of pictures is generally limited to eight, twelve or sixteen. These numbers are sufficient for an amateur photographer, but they are clearly inadequate for a professional photographer, for whom the time lost in reloading the camera may cause him to miss some interesting shots.

In order to overcome this difficulty, this invention provides the camera, on the one hand, with a magazine capable of holding large capacity spools and means for winding the film from a film spool to a take-up spool after passing in front of the aperture of the camera and, on the other hand, means for rendering the chambers containing the two spools fully lightproof, so that it may be possible to open the camera magazine gate without the risk of clouding the exposed film held on the take-up spool, or of exposing the unused film still on the film spool.

The accompanying drawings illustrate, by way of example, one embodiment of such a camera magazine, according to the invention.

The magazine is intended for association with a view taking camera, chiefly a professional reporter's camera such as a reflex camera of any suitable kind.

Figure 1:
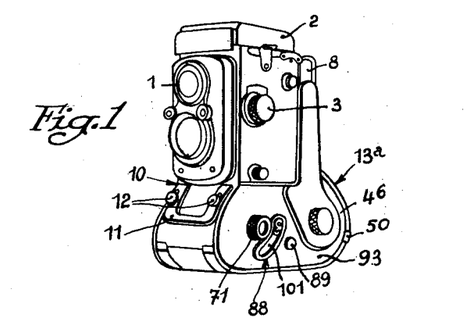
Figs. 1 and 2 are perspective views of the magazine as seen from opposite directions.
Figure 2:
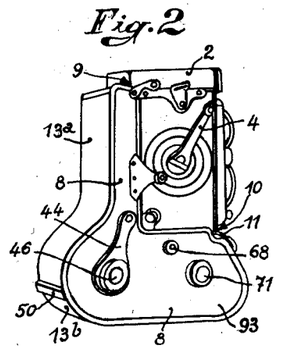

The camera illustrated with the magazine in Figs. 1 and 2 is assumed to operate with films carrying 12 pictures of a 6 x 6 size. The said camera which does not form part of the present invention is shown in Figs. 1 and 2 as including the following conventional parts: the focusing and view taking lens unit 1, the flap cover 2 used for focusing purposes, the knob controlling the focusing distance 3 and the film advance crank 4, which latter produces through a gear which is of a well-known type the rotation of a driving spindle 5 to which is normally keyed the take-up spool.

Now my invention has for its object to modify the magazine of this camera so as to allow it to operate with very long films whereby the operator may take say 150 pictures without having to change his film.

To this end, I remove the lower and rear gate-forming wall of the reflex camera referred to and also the driving spindle 5 and I provide a detachable magazine designated in the different figures by the reference number 8 with a view to closing the lower and rear surfaces of the camera which has thus been laid bare. Furthermore, I substitute for the driving spindle 5 a removable metal roller 6 carrying at one end a coaxial pinion 7. This roller is obviously driven by the film advance crank 4 and serves as disclosed hereinafter to drive the take up spool which is now carried inside the detachable magazine 8.

Said detachable magazine substituted for the gate of the camera closing the rear and lower surfaces of the latter is hooked at one end at 9 to the top of the back of the camera and, at the other end 10, it is secured to the lower edge of the front of the camera by means of a brace 11 held in position by milled knobs 12.

This magazine 8 includes two side flanges 93 to the outer transverse ends of which are secured a front door 13a and a lower door 13b which doors are hinged respectively at 14a and 14b to the corresponding ends of the flanges, and define, with a cross-member provided between the two flanges near the end 9 of the magazine engaging the top of the back of the camera and with a broad cross member at the opposite end of the magazine, a comparatively large space underneath the camera and between the latter and the lower door 13b, inside which chamber are formed on the one hand, near the hinge 14b of the lower door 13b, a chamber for the feed spool and on the other hand, and facing the meeting point of the two doors a second chamber for the loader for housing the take-up spool; the film or feed spool is shown at 19 while the takeup spool is shown at 33.

Figure 4:
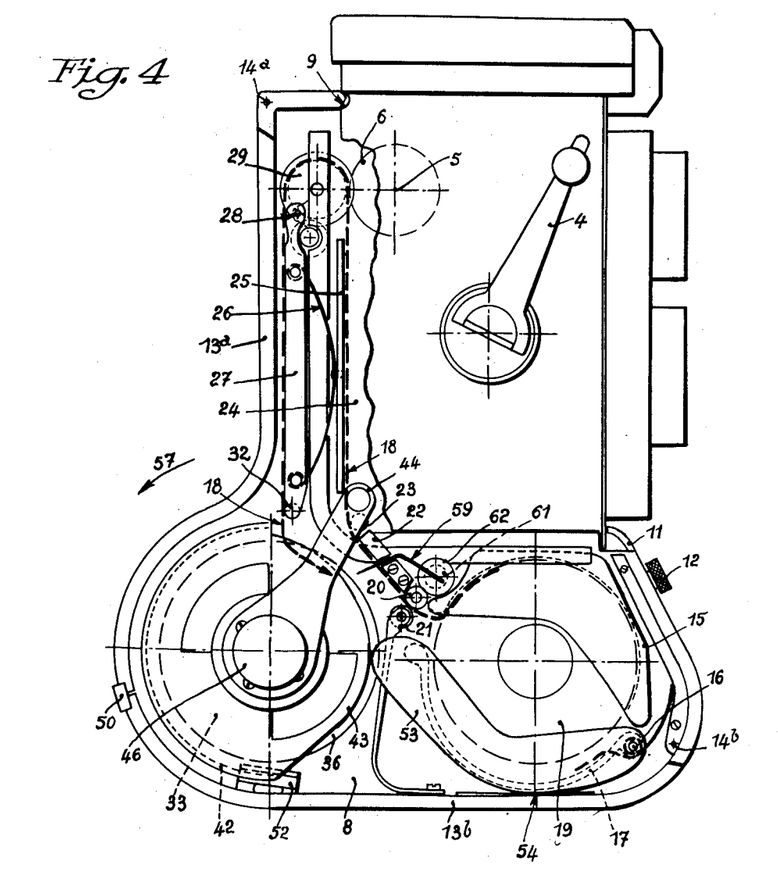
Fig. 4 is an elevational view on an enlarged scale of the magazine seen from the right hand side, the right hand flange being torn off, said figure showing the magazine in its operative position.

The casing for the feed spool 19 includes a bottom constituted by the first mentioned cross member, forms a laterally open cylindrical surface and is lined inwardly with velvet and to its edge near the hinge 14b of the door 13b is pivotally secured round a spindle 16 a cooperating part cylindrical cover 17 also lined with velvet so as to form with the bottom of the casing a complete closed cylindrical casing. A spring urges the casing 15—17 open so that its cover 17 abuts permanently as illustrated in Fig. 4 against the lower door 13b. Said spring may thus, as disclosed hereinafter, hold during operation of the camera said cover 17 in a position such with reference to the casing bottom 15 that there is formed between the sections 15 and 17 a slot through which the film 18 passes off the feed spool and out of the casing.

Inside the casing 15—17 is housed the feed spool 19 carrying the reel of unexposed film, which reel is, as already mentioned, very large so as to provide for the taking of say 150 pictures. As it passes out of the casing 15, the film shown at 18 is fed between two rollers 20 and 21 and then underneath a small plate 22 arranged obliquely between the magazine flanges and across the corner separating the rear and lower surfaces of the camera. When it has reached the upper end of said small plate, the film 18 continues progressing under the roller 23 provided on the camera at the lower end of the exposure gate 24 in the back of the camera. The film 18 is urged against said gate by a presser plate 25 mounted on the magazine and acting as a light tight member. As a matter of fact said presser plate is carried through the agency of a spring 26 by a frame or fitting 27 pivotally secured at 28 between the flanges of the magazine. Above the exposure gate 24 in the camera, the film 18 is clamped between the metal roller 6 mounted on the camera as disclosed hereinabove and a cooperating pressure roller 29 carried by the magazine and made of rubber or the like yielding material. Said roller 29 is mounted on a spindle coaxially rigid with a pinion 31 meshing permanently with the pinion 7 coaxially rigid with the metal roller 6. Thus the yielding pressure roller 29 is positively carried along by the film advance crank 4 on the camera driving the roller 6 with the interposition of the film 18, the feeding of which between the two rollers 6 and 29 is thus ensured.

Figure 13:
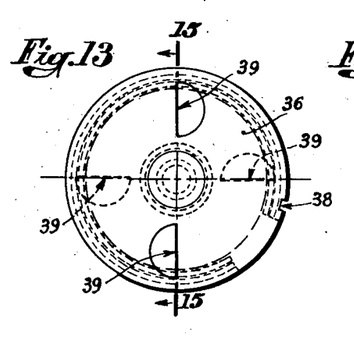
Figs. 13, 14 and 15 are views of the loader carrying a spool as seen respectively endwise and cross sectionally through lines 14—14 of Fig. 15 and 15—15 of Fig. 13.
Figure 14:
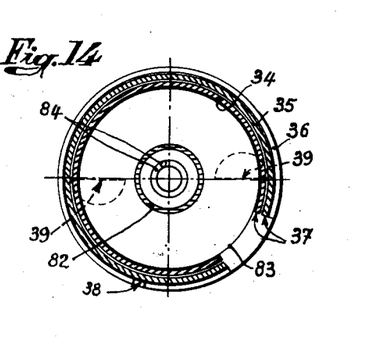
Figures 15, 16, 17:
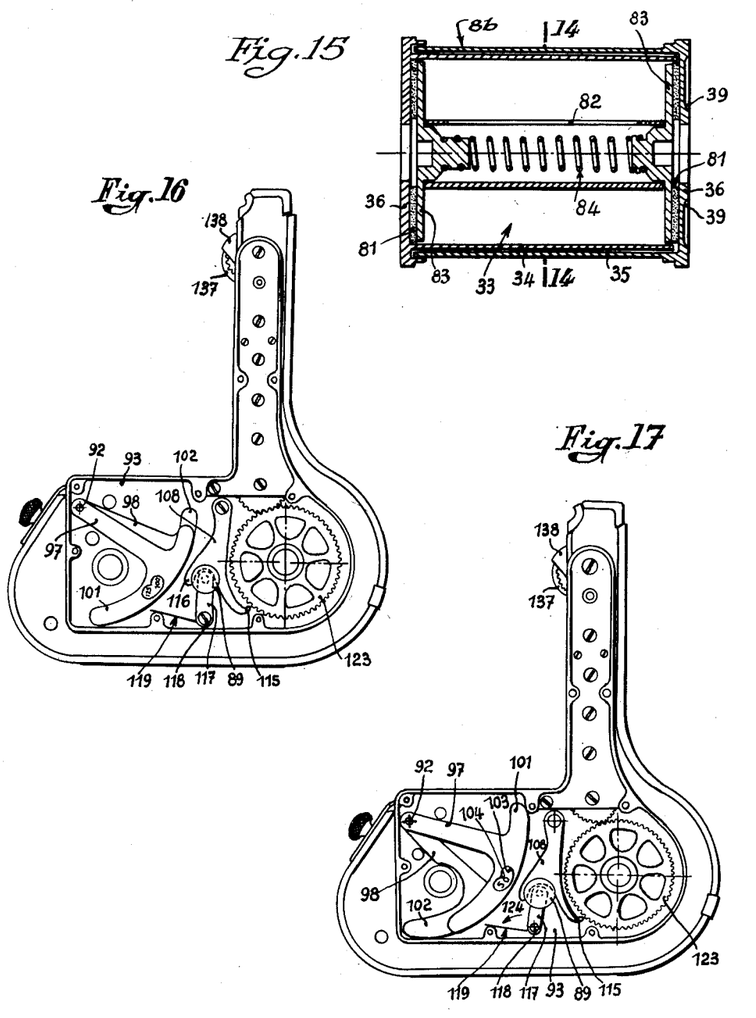
Figs. 16 and 17 are outer elevational views of the left hand flange of the magazine after removal of the lateral plates concealing the mechanism, Fig. 16 showing the magazine as still containing a length of film to be exposed while in Fig. 17 the whole film length inside the magazine has already been unwound and exposed.

The film 18 is guided downwardly as it leads the yielding roller 29 to the rear of the presser plate 25, and at the level of the lower edge of the latter it passes over a small roller 32 before it enters the loader containing the take up spool 33. As a matter of fact, this spool 33 is housed inside a loader fitted removably inside the lower part of the magazine close to the feed spool casing 15. Said loader is constituted as shown in Figs. 13, 14, and 15 by two cylindrical members 34 and 35 engaging each other and carrying each a terminal cheek or flange such as 36; each of the cylindrical members 34 and 36 is furthermore slotted longitudinally at 37; the two slots register with each other for a predetermined relative angular position of the two cylindrical members so as to open the loader when the latter is to become operative. Each cheek 36 of the loader is provided with a notch 38 at its periphery and with two depressions 39 along its outer surface, the object of said notch and depressions being disclosed hereinafter.

Figure 3:
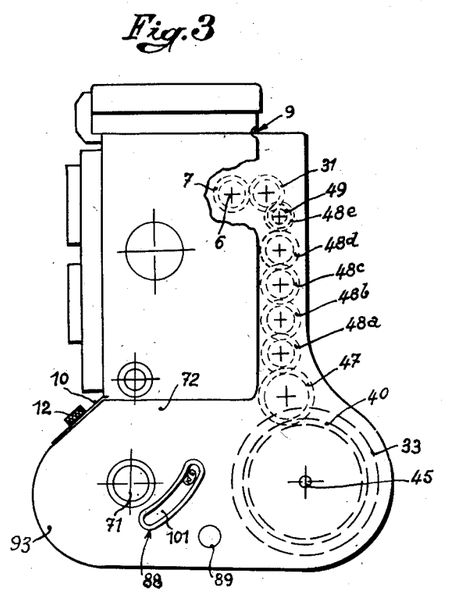
Fig. 3 is an elevational view of the magazine as seen from the left, the left hand flange of the magazine being partly torn off.
Figures 8, 9, 10:
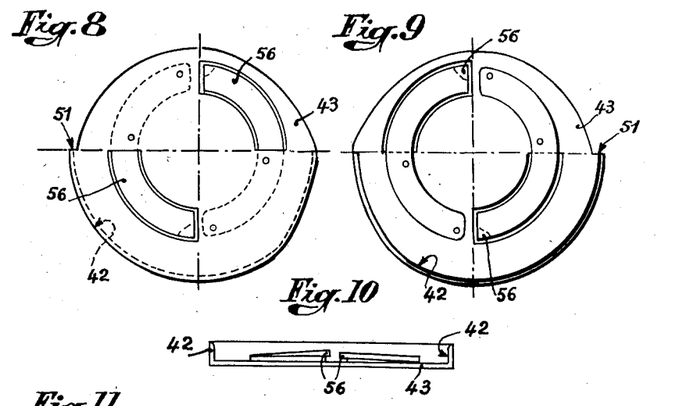
Figs. 8, 9 and 10 are respectively an outer front view, an inner front view and a view from above of a cam forming part of the magazine.
Figure 11:
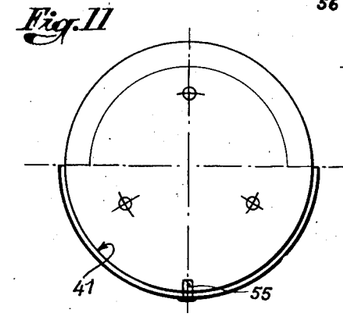
Figs. 11 and 12 are respectively an inner front view and a side elevational view of the stationary cradle for the loader.
Figure 12:
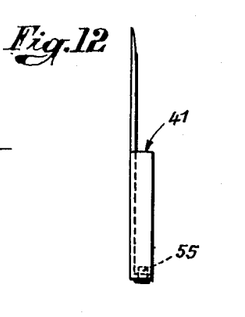

The loader is independent of the actual magazine 8 and it remains stationary during operation of the camera while the spool 33 carried inside it revolves as the film is being unwound. The loader 34—35 is held inside the magazine 8 by the semi-circular cradles 41 and 42 carrying the corresponding cheeks 36. The cradle 41 (Figs. 11 and 12) is permanently rigid with one of the flanges of the magazine while the other cradle 42 (Figs. 8 to 10) forms part of a cam member 43 which may be angularly shifted through the agency of the control lever 44 rotatably carried in the other flange. Axial supports 45 (Fig. 3) for the loader which may recede through actuation of the outer milled knobs 46 carry the take-up spool 33 in a conventional manner. The take up spool 33 is driven into rotation in unison with the rollers 6 and 29 so that the film fed by the feed spool 19 and passing between the rollers 6 and 29 may be wound over the take up spool 33. To this end, one of the axial supports 45 of said spool 33 is rigid with a pinion 40 (Fig. 3) meshing with a pinion 47 driven in its turn by a gear system 48a, 48b, 48c—48d, 48e. The last mentioned gear, 48e, is carried by a spindle to which is keyed a small pinion 49 meshing with the pinion 31 coaxially rigid with the roller 29. Thus actuation of the film advance crank 4 produces the simultaneous rotation of the rollers 6 and 29 and of the take up spool 33.

During normal operation of the camera, the doors 13a and 13b of the magazine are obviously closed; the casing containing the feed spool 19 is open so as to allow the film to pass between its cover 15 and bottom 17 and the loader 34—35, containing the take up spool 33 is also open. It is thus apparent that the film 18 follows the path illustrated in Fig. 4 in thick interrupted lines when the film advance crank 4 is operating.

The closing of the doors 13a and 13b of the magazine and the opening of the casing 15, 17 and of the loader 34—35/36 are controlled as follows by the above referred to lever 44: in its extreme angular position it releases both doors and holds the casing and holder closed. When said lever 44 is shifted away from this extreme position toward its other extreme position it first locks the lower door 13b and then releases the cover 17 with reference to the cooperating bottom 15, said cover abutting then under the action of its spring against the closed door 13b. The lever 44 continuing its rotation, it provides for the opening of the loader and as it approaches its other extreme position it may lock the other or rear door 13a which should be set in its magazine closing position together with the lower door 13b, when the lever is in its above mentioned first extreme position. This locking of the rear door is however optional since the said rear door is in all cases held in its closed position by the lower closed door. The complete closing of the magazine with the casing and loader open is thus obtained for the last mentioned extreme position of the lever 44. The opening of the magazine is thus obtained by shifting the lever into its first mentioned extreme position so as to release the lower door which carries the casing. It is apparent that when moving the control lever 44 towards this first-mentioned extreme position, the loader and the casing 15—17 close before the lower door is released.

When the control lever 44 occupies its second extreme position, as illustrated in Fig. 4 for which the magazine is closed, the angular position of the cam 43 is such that the inner surface of the cradle 42 engages the underside of a lug 52 rigid with the lower door 13b. Said lower door is thus locked with reference to the lateral flanges of the magazine by the cam 43 which is carried as already mentioned by one of said flanges. The rear door 13a on the other hand is held in position by this door 13b because its free end has engaged the inner surface of the end of the latter as shown at 50 in Figs. 1, 2 and 4. The optional locking of the closed rear door need not be illustrated or described.

When the lever 44 occupies said position illustrated in Fig. 4, the position of the cam 43 is such that its smaller radius section registers with the casing containing the feed spool 19 so that there is a narrow gap between the lever shaped extension 53 of the closed cover 17 of said casing and the cam. Consequently under the action of its return spring 17a, the cover 17 of said casing is urged away from the cooperating section 15 whereby the desired narrow opening is obtained; in the position considered said lever 53 rigid with the cover 17 of the casing does not bear against the periphery of the cam and engages through its outer incurved surface 54 the inner surface of the lower door 13b (Fig. 4). For the same position of the lever 44, i. e. that which is illustrated in Fig. 4, the two cylinders 34 and 35 of the loader occupy a relative position such that their slots 37 register and their common angular position allows the film 18 to enter the loader as it passes beyond the roller 32.

As a matter of fact at the moment of the positioning of the loader 34—35 inside the magazine 8, said loader is given a position such that the slots 37 are superposed, and to this end the loader is laid inside the cooperating cradles 41—42 carried by the flanges of the magazine 8 in a manner such that the notch 38 of one of the loader flanges 36 is fitted over a stud 55 (Figs. 11 and 12) rigid with the stationary cradle 41. One of the cylindrical members, 34 for instance, of the loader assumes thus a rigid location inside the magazine 8 while the other cylindrical member is adapted to be rocked by the control lever 44 as will now be described. In fact, when the whole length of film carried by the feed spool 19 is wound inside the loader 34—35 on the spool 33 and it is desired to proceed with the removal of said spool 33 with a view to developing the film, it is necessary before opening the doors 13a and 13b to close the loader 34—35, failing which the last pictures on the exposed film carried by the spool 33 would risk being fogged. The required closing of the loader is obtained, as follows: the cam 43 rigid with the lever 44 is provided on its inner surface with laterally projecting elastic catches 56 (Figs. 8 to 10) which are adapted when the lever 44 has been brought into the position illustrated in Fig. 4 for which the magazine is closed and the camera is operative, to enter the corresponding depressions 39 in the flange on the member 35 of the loader which is not permanently held fast inside the magazine 8 through engagement of the notch 38 in its flange with a stud 55 on the side opposed to the cam.

Figure 5:
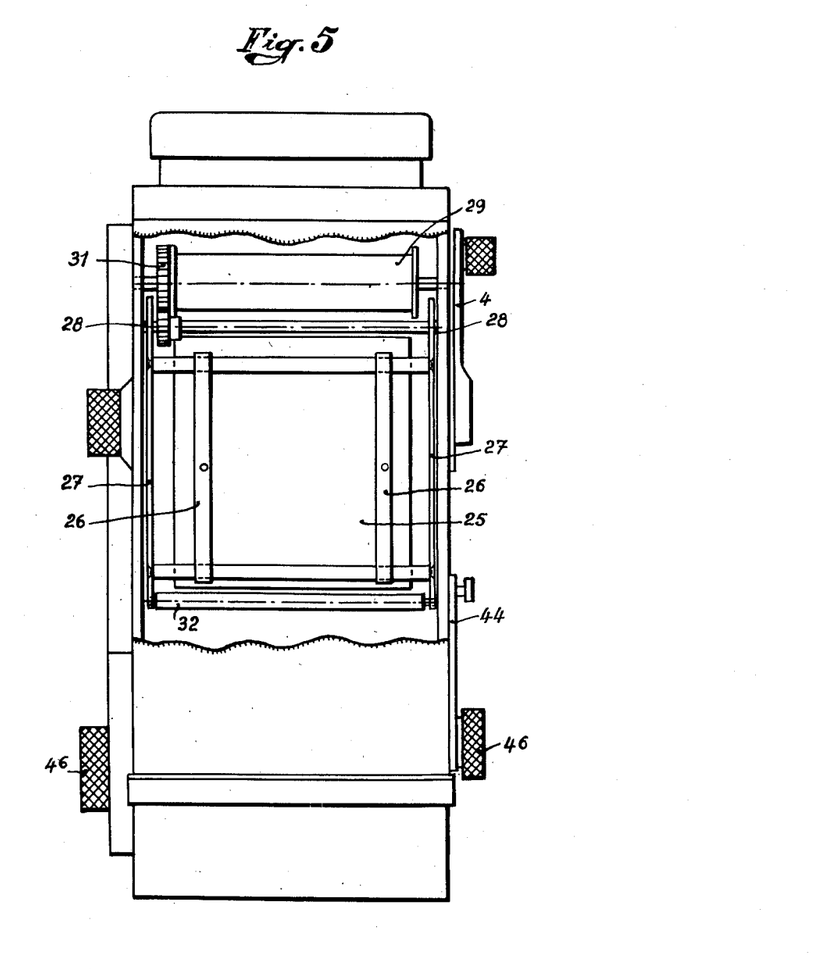
Fig. 5 is a rear elevational view of the same magazine, the rear wall of the magazine being also partly torn off.

Consequently, when the lever 44 is turned rearwardly towards its magazine opening position in the direction of the arrow 57 shown in Figs. 4 and 5, this produces an angular shifting drive of the cylindrical member 35 of the loader through the agency of the catch 56 carried by the cam 43; thus the loader containing the exposed film is closed through a relative shifting between the slots in the two members of the loader.

Figure 6:
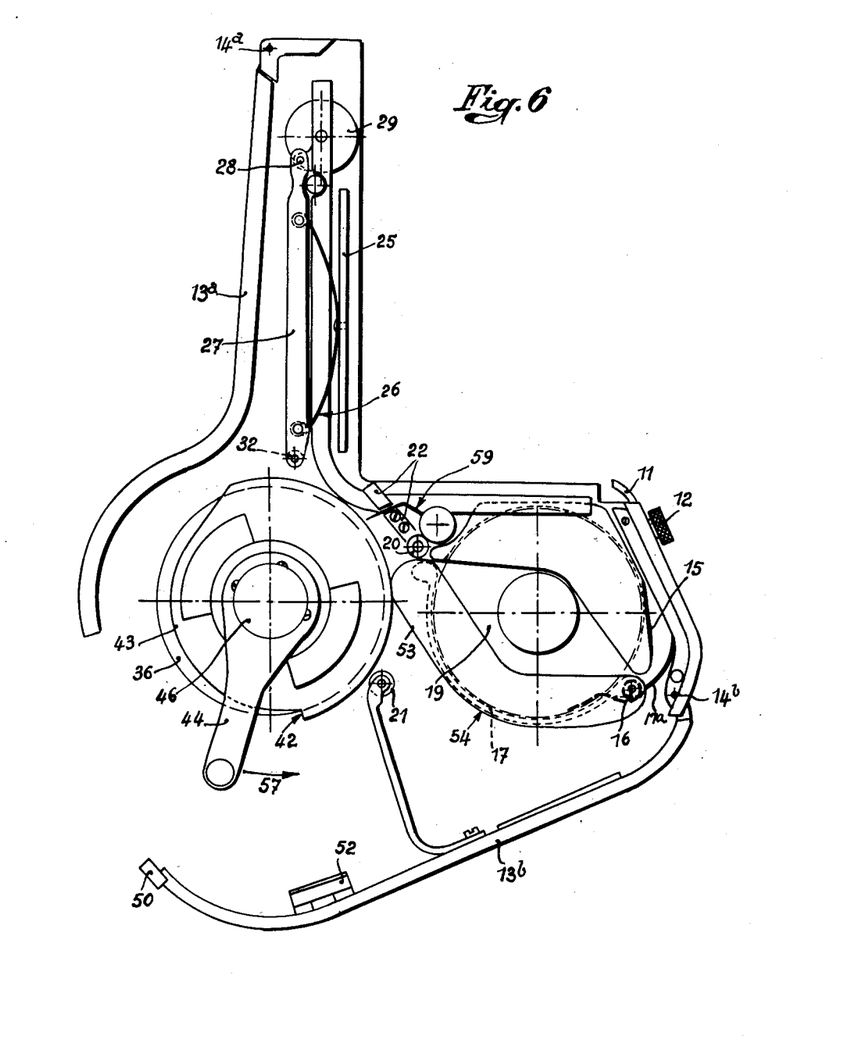
Figs. 6 and 7 are side elevational views similar to Fig. 4 the apparatus being shown in Fig. 6 in a position ready for partial unloading and in Fig. 7 in a position ready for complete unloading.

As the lever 44 is shifted in the direction of the arrow 57, said cylindrical member 35 of the loader continues rotating with reference to the stationary cylindrical member 34 in unison with the cam 43. When the lever is near its extreme position, as illustrated in Fig. 6, the lug 52 rigid with the lower door 13b is no longer engaged by the cradle 42 rigid with the cam 43. At this moment, it is possible to open the released door 13b and also the door 13a which is no longer held in position by said released door and after moving outwardly the milled knobs 46, the loader 34, 35 may be withdrawn outside the magazine 8 so that the exposed film carried inside it may be developed. On the other hand during the turning movement described, the cam 43 has exerted through its large diameter area a pressure such on the lever 53 on the cover 17 of the casing carrying the feed spool 19 that said cover has engaged as illustrated in Fig. 6 over the cooperating bottom section 15 of the casing whereby the latter is closed in a lighttight manner.

The arrangement disclosed allows in association with a cutter 59 extending over the film as it passes out of the casing 15—17 and controlled by an outer knob 68 to cut off and remove the exposed length of film contained inside the loader 34—35, even if an unexposed length of film is still carried inside the casing 15.

When an exposed length of film is carried inside the loader 34—35, it is thus sufficient to operate the control lever 44 as described above so as to obtain in succession the closing of the loader 34—35, the closing of the casing 15 containing the unimpressed film length and the opening of the doors 13a and 13b of the magazine 8.

It is therefore possible to open the magazine without risking any fogging of the exposed film inside the loader 34—36 or any exposure of the unexposed film remaining inside the casing 15—17.

Figure 7:
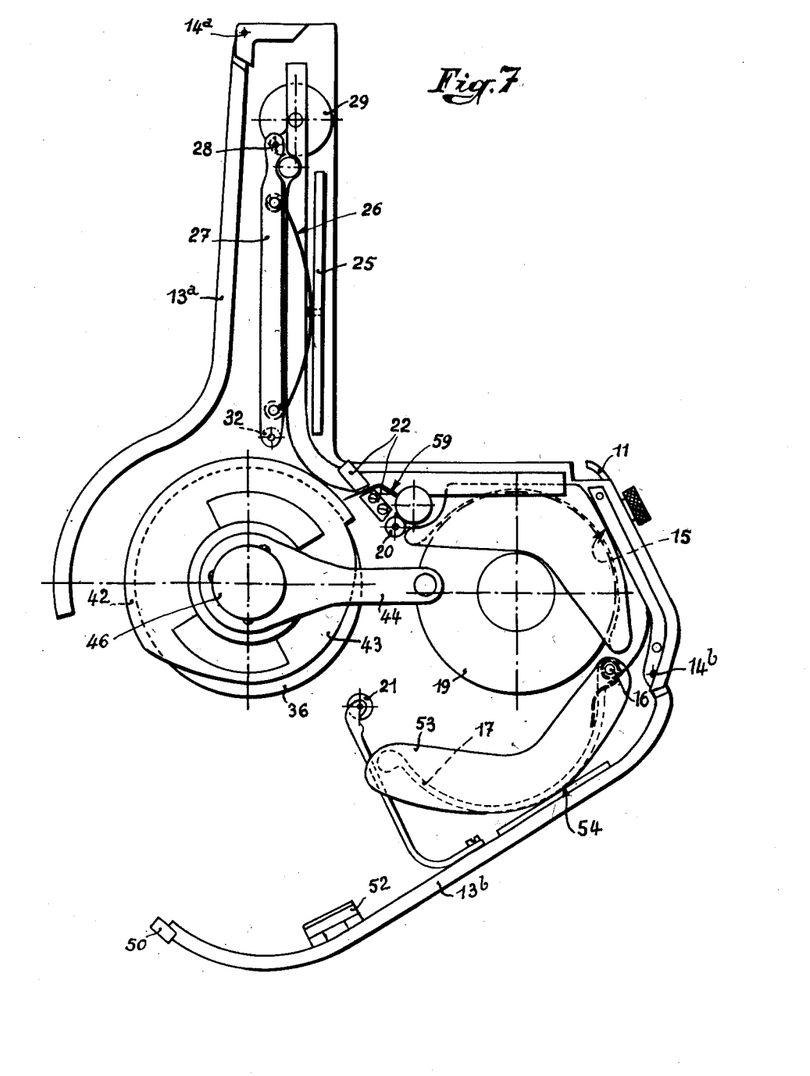

When the entire unexposed film inside the casing 15—17 has been used and it is necessary to proceed with a reloading of the magazine, it is sufficient to provide again for the movement of the lever in the direction of the arrow 57 so as to bring the arrangement into the position illustrated in Fig. 7 for which the cam 43 occupies a position such that it no longer holds in position the lever 53 controlling the cover 17 of said casing which opens then completely as illustrated in said Fig. 7. The magazine doors remaining open, the knobs 71 (Fig. 3) carrying the spindle of the spool 19 are then withdrawn whereby said spool may be removed and replaced by a fresh spool carrying an unexposed film.

Since the magazine is adapted to be used so as to allow the exposed part of the film inside the loader to be developed even before the film on the feed spool 19 is completely exposed, it is necessary to provide means showing at every moment the approximate number of pictures which remain to be taken i. e. the length of unexposed film still remaining inside the casing 15—17.

Figures 18, 19, 20:
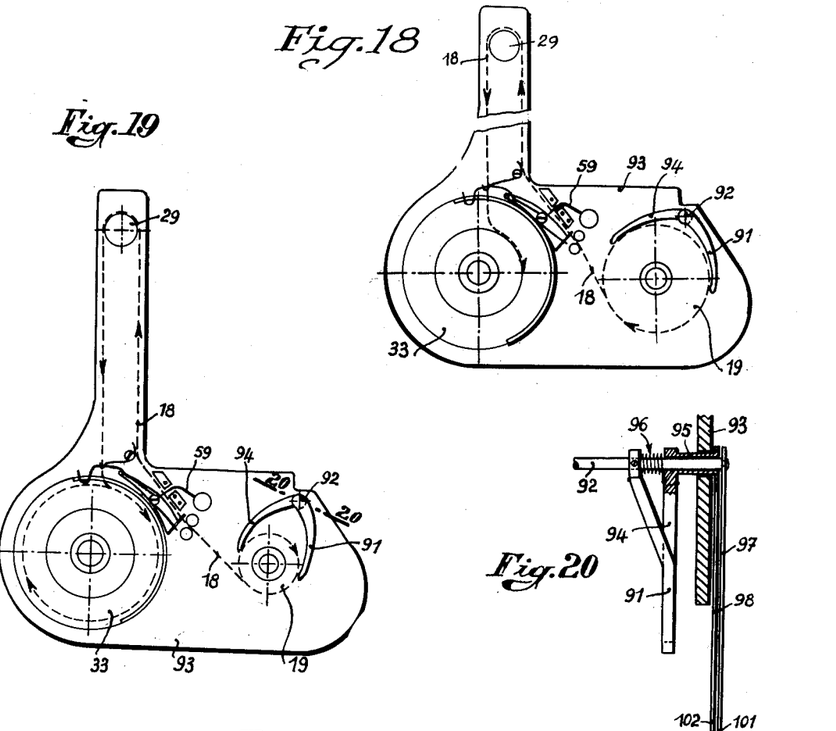
Figs. 18 and 19 are views corresponding to Figs. 16 and 17 of the inner surface of the same left hand flange of the magazine.
Fig. 20 is a sectional view on an enlarged scale through line 20—20 of Fig. 19, showing the footage indicator. Lastly

The footage indicator resorted to for this purpose includes as illustrated in Figs. 18—19 and 20, a double feeler forming tongs of which one arm 91 is keyed to a spindle 92 revolubly carried by one of the flanges 93 of the magazine while its other arm 94 is rigid with a socket revolving freely on said spindle 92 and also extending through said flange. A helical spring 96 outwardly coaxial with the spindle 92 and engaging through its ends the two arms of the feeler 91—94 urges said arms into their closed position. On the outside of the magazine flange considered are provided two levers, respectively 97 keyed to the spindle 92 and 98 keyed to the socket 95. Each of said levers terminates at its outer end with an arcuate blade respectively 101 for the lever 97, and 102 for the lever 98. These two blades arranged coaxially with the spindle 92 have therefore a tendency 94 to be shifted with reference to each other together with the arms 91—94 as the latter are spaced apart against the action of spring 96 and towards each other by said spring.

The blade 101 is provided as illustrated in Figs. 16 and 17 with a gate 103 through which a scale carried by the cooperating blade 102 appears to view; said scale indicates the approximate number of views which are still to be exposed on the film carried by the feed spool 19. In order that the reading through the gate 103 may be sufficiently accurate, the latter is provided with a pointer 104.

The operation of this footage indicator is as follows: the spindle 92 controlling said operation is housed inside the casing containing the feed spool 19 so that the two arms 91 and 94 of the feeler engage either side the film wound round said feed spool; by reason of the tractional stress exerted by the spring 96, the two arms 91—94 close over the film as the amount of film decreases on the spool, but through the closing of said arms 91 and 94 (Fig. 19), there is provided simultaneously for a corresponding movement of the levers 97 and 98 and consequently of the blades 101 and 102 (Fig. 17) of the footage indicator. The consequent result is therefore that the gate 103 in the blade 101 and the scale on the blade 102 are shifted with reference to each other and the number of pictures remaining to be taken is read through the outer gate 88 through which the gate 103 in the blade 101 is apparent to view, said gate 88 being formed in the adjacent flange 93 of the magazine.

It should be remarked that the above described footage indicator allows obtaining an accurate and steady indication as to the approximate number of pictures which may still be taken on the feeding spool even if, as is frequently the case, the film is wound in a slightly eccentric manner over the spool spindle. The system including the blades 101 and 102 and consequently the pointer 104 and the cooperating scale moves as a matter of fact with reference to the elongated gate 88 formed in the magazine so as to allow at any time a reading of the indicator.

Figure 21:
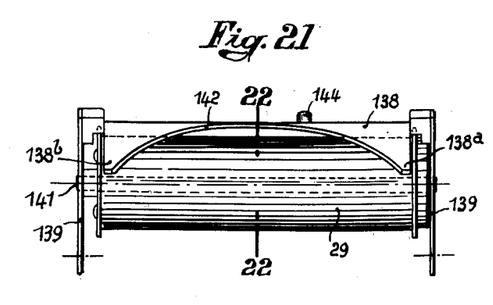
Figs. 21 and 22 are respectively a front view and a cross-sectional view through line 22—22 of Fig. 21 of a modification of the pressure roller.
Figure 22:
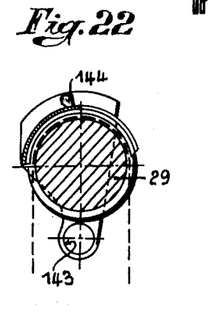

Lastly to allow the operator to lose less time when loading a film and engaging the front leader of the film between the driving roller 66 carried by the camera and the cooperating flexible pressure roller 29, prior to feeding the front leader to the loader containing the take-up spool, it is of advantage to provide, as shown in Figs. 21 and 22, said pressure roller 29 with a part cylindrical guide 138 having an arcuate front edge so as to further the introduction of said front leader and its passage over the pressure roller. Said part cylindrical guide 138 is carried by cheeks 139 serving as supports for the spindle 141 of the pressure roller and it surrounds the latter over about one third of its periphery. Its front edge facing the input of the film over the pressure roller is concave.

Consequently, as soon as the front leader arrives in register with the yielding pressure roller 29, it engages the underside of the guide 138 adjacent the ends of the latter and then follows the inner wall of the guide, whereby it is constrained to execute a half turn so as to progress in the direction of the loader. Of course, the front edge 142 of the guide may assume any other desired shape such as that of a succession of concave lines instead of only one as illustrated.

The cheeks 139 carrying the yielding pressure roller 29 and the guide 138 show an interesting feature inasmuch as they are not rigid with the flanges of the magazine and are mounted so as to be capable of rocking with reference to the latter. To this end, said cheeks are provided at their lower end with a perforated projection 143 carrying a spindle mounted in the magazine between the flanges of the latter. Furthermore, the system including the cheeks 139, the presure roller 29, the guide 138, is submitted to the pressure of a spring urging it in a direction such that the roller 29 operatively engages the driving roller 6 in the camera. Said spring which engages a stud or projection 144 on the guiding cover 138, is furthermore disconnectable. This allows cutting out the engagement between the roller 29 and the roller 6 of the camera and thereby it is possible to re-insert the front leader of the film if it has not been inserted straight at first.

This possibility of disconnecting the spring allows furthermore changing the film during operation even if the whole film on the feed spool has not been unwound and exposed. It is sufficient, as a matter of fact, to cut the exposed length of film through the agency of the knife or cutter 59 and after having fed into the loader said exposed length of film, a front leader is glued to the front end of the remaining unexposed film length, said rearward motion of this front leader being obtained through rotation of the knob 71 already referred to in the description of Fig. 1, as controlling the spool 19. Thus, the unexposed film length may be removed and replaced.

The yielding roller 29 and the associated pinion 31 are adapted to move bodily with the above described arrangement round said spindle engaging the perforations in the projections 143 on the cheeks under the action of a lever pivotally secured to the outside of one of the magazine flanges and operatively connected with the corresponding cheek 139. Rotation of the lever provides for the desired angular shifting of the roller against the action of the spring engaging the stud 144 while the pinion 31 remains in engagement with the cooperating pinion 48e by reason of the latter being coaxial with the perforations in the projections 143.

Independently of the advantages obtained through the use of the above described magazine which allows resorting to an unexposed film spool of a considerable length corresponding to say 150 pictures and even more and which allows also proceeding with the development of the exposed section of the film without any risk of fogging the remaining unexposed section of the film or of fogging said exposed section, my improved magazine shows the following further advantageous features:

Not only the inner surface of the casing 15 is lined with velvet so as to ensure perfect light tightness for said casing but the cheeks 36 of the loader are also lined with velvet as shown at 81 in Fig. 15.

The two cylinders 34 and 35 forming the loader are given an outline such that for a predetermined relative angular position of the two cylinders, the loader is perfectly light tight along the cooperating free edges of their slots and holds fast the spol inside it;

The small plate 22 cooperates with the cutter so as to provide not only the cutting and the notching of the film but also serves for gluing a strip of paper at the free end of an unexposed film or film section so as to form a front leader for said section after cutting off the exposed section to the front thereof;

The spools carried by the magazine, whether the feed spool 19 or the take up spool 33 are constituted as illustrated in Fig. 15 by a hub 82 with a continuous slot and to the two ends of which are elastically secured cheeks 83 made of blued steel, said cheeks being interconnected by a strong helical spring 84; this leads to an exceptionally high resistance for the spools, together with an elasticity such that they may be deformed without any risk of damage when they fall on a hard ground for instance.

What is claimed is:

1. In combination with a view-taking camera, chiefly a reflex camera, including a casing with open rear and lower surfaces, a view taking gate registering with said rear surface, driving means located near the upper end of the rear open surface of the casing, and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and a rear door rigidly secured each to the corresponding cross-member and adapted with said flanges and cross-members to enclose a lighttight space forming underneath the camera two large front and rear chambers lying in substantially adjacent relationship, normally open means adapted to close in a light tight manner the front chamber, a feed spool revolubly carried inside said front chamber, a take up spool revolubly carried inside the rear chamber, both spools being of a large film-carrying capacity, a yielding roller revolubly carried by the magazine, when fitted on the camera, in substantial tangential engagement with the removable film-guiding roller in the camera, means whereby the control member on the camera drives, through the driving means and the pinion rigid with the coaxial roller, the film from the feed spool to the take up spool along a path registering with the view taking gate of the camera and extending between the removable roller and the yielding roller cooperating therewith, safety means carried by one of the flanges and adapted to hold the closing means of the front chamber in their operative condition, a hand-operable lever on the outside of the magazine controlling said safety means, means whereby said means when shifted away from its position holding the closing means in their operative position in a predetermined direction locks the magazine doors and then releases the closing means for the front chamber enclosing the feed spool after said locking of the magazine doors.

2. In combination with a view-taking camera, chiefly a reflex camera including a casing with open rear and lower surfaces, a view taking gate registering with said rear surface, driving means located near the upper end of the rear open surface of the casing and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter, and including two lateral flanges, a front lower and a rear upper cross-member connecting the corresponding ends of said flanges and a member connecting the corresponding ends of said flanges and a lower and a rear door rigidly secured each to the corresponding cross-members and adapted with said flange and cross-members to enclose a light tight space forming underneath the camera two large chambers lying in substantially adjacent relationship, means adapted to close in a light tight manner the front chamber, a feed spool revolubly carried inside said front chamber, a take up spool revolubly carried inside the rear chamber, both spools being of a large film-carrying capacity, a yielding roller revolubly carried by the magazine, when fitted on the camera, in substantial tangential engagement with the removable film-guiding roller in the camera, means whereby the control member on the camera drives through the driving means and the pinion rigid with the coaxial roller, the film from the feed spool to the take up spool along a path registering with the view-taking gate of the camera and extending between the removable roller and the yielding roller cooperating therewith, a cam revolubly carried by one of the flanges and adapted to hold the closing means of the front chamber in their operative condition, a hand-operable lever on the outside of said magazine controlling said cam, means whereby the cam is adapted to release the means closing the front chamber enclosing the feed spool whenever the doors of the magazine are closed, whenever they are opened for changing the feed spool and again whenever the door hinged to the front of the lower side of the magazine is closed and the other door is open, and means for metering approximately the unexposed length of the film on the feed spool.

3. In combination with a view-taking camera, chiefly a reflex camera, including a casing with open rear and lower surfaces, a view taking gate registering with said rear surface, driving means located near the upper end of the rear open surface of the casing, and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and a rear door rigidly secured each to the corresponding cross-member and adapted, with said flanges at cross members, to enclose a light tight space forming underneath the camera two large chambers lying in substantially adjacent relationship, a cover hinged round an axis transverse with reference to the magazine flanges and adapted to close in a light tight manner the front chamber, a feed spool revolubly carried inside said front chamber, a take up spool revolubly carried inside the rear chamber, both spools being of a large film-carrying capacity, a yielding roller revolubly carried by the magazine, when fitted on the camera, in substantial tangential engagement with the removable film-guiding roller in the camera, means whereby the control member on the camera drives, through the driving means and the pinion rigid with the coaxial pinion, the film from the feed spool to the take up spool along a path registering with the view-taking gate of the camera and extending between the removable roller and the yielding roller cooperating therewith, a cam revolubly carried by one of the flanges and adapted to hold the cover closing the front chamber in its operative condition, a hand-operable lever on the outside of the magazine controlling said cam, and means whereby the angular shifting of the lever and cam produces first a locking of the lower door hinged to the front of the lower side of the magazine to close the interval separating the lower edges of the magazine flanges and then a release of the cover of the front chamber enclosing the feed spool to form an outlet slot for the film on the feed spool of said front chamber, means whereby the locked lower door holds the rear door in its closed position and means for metering approximately the unexposed length of film carried by the feed spool.

4. In combination with a view-taking camera, chiefly a reflex camera, including a casing with open rear and lower surfaces, a view taking gate registering with said rear surface, driving means located near the upper end of the rear open surface of the casing, and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and a rear door rigidly secured each to the corresponding cross-member and adapted with said flanges and cross members to enclose a light tight space forming underneath the camera two large chambers lying in substantially adjacent relationship, a cover hinged round an axis transverse with reference to the magazine flanges and adapted to close in a light tight manner the front chamber, a feed spool revolubly carried inside said front chamber, a take-up spool, a loader revolubly carrying the take-up spool, adapted to be fitted inside the rear chamber and including two coaxial cylindrical sections interengaging each other, adapted to rotate with reference to each other round their axis and provided each with a slot along a generating line, the two slots being adapted to register during the view-taking to allow the winding of the film through said slots onto the take-up spool, both spools being of a large film-carrying capacity, a yielding roller revolubly carried by the magazine, when fitted on the camera, in substantial tangential engagement with the removable film-guiding roller in the camera, means whereby the control member on the camera drives, through the driving means and the pinion rigid with the coaxial pinion, the film from the feed spool to the take-up spool along a path registering with the view-taking gate of the camera and extending between the removable roller and the yielding roller cooperating therewith, a cam carried by the magazine and adapted to revolve round the location of the axis of the take-up spool and to hold the cover of the front chamber in its operative condition, a hand-operable lever on the outside of the magazine controlling said cam, means adapted to rigidly secure one loader section to one flange; means whereby the cam shifts the other loader section angularly with reference to the first section to open the loader when the magazine doors are closed and means whereby the said cam when shifted, away from its position holding the cover towards a predetermined direction, locks the magazine doors and then releases the cover for the front chamber enclosing the feed spool after said locking of the magazine doors.

5. In combination with a view-taking camera, chiefly a reflex camera, including a casing with open rear and lower surfaces, a view taking gate registering with said rear surface, driving means located near the upper end of the rear open surface of the casing, and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and a rear door rigidly secured each to the corresponding cross-member and adapted, with said flanges and cross-members, to enclose a light tight space forming underneath the camera two large chambers, lying in substantially adjacent relationship, means adapted to close in a light tight manner the front chamber, a feed spool revolubly carried inside said front chamber, a take up spool revolubly carried inside the rear chamber, both spools being of a large film-carrying capacity, a yielding roller revolubly carried by the magazine, when fitted on the camera, in substantial tangential engagement with the removable film-guiding roller in the camera, means whereby the control member on the camera drives, through the driving means and the pinion rigid with the coaxial pinion, the film from the feed spool to the take up spool along a path registering with the view-taking gate of the camera and extending between the removable roller and the yielding roller cooperating therewith, a presser plate extending inside the magazine in parallel relationship with the location of the view-taking gate in the camera and adapted to urge the film against said gate as it moves between the feed spool and the yielding roller and to provide for light tightness of the area inside the magazine to the rear of said presser plate which area defines the film path between the yielding roller and the take up spool, a cam revolubly carried by one of the flanges and adapted to hold the closing means of the front chamber in their operative condition, a hand-operable lever on the outside of the magazine controlling said cam, means whereby said cam when shifted, away from its position holding the closing means, in a predetermined direction locks the magazine doors and then releases the closing means for the front chamber enclosing the feed spool after said locking of the magazine doors.

6. In combination with a view-taking camera, chiefly a reflex camera, including a casing with open rear and lower surface, a view taking gate registering with said rear surface, driving means located near the upper end of the rear open surface of the casing, and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and a rear door rigidly secured each to the corresponding cross-member and adapted, with said flanges and cross-members, to enclose a light tight space forming underneath the camera two large chambers lying in substantially adjacent relationship, means adapted to close in a light tight manner the front chamber, a feed spool revolubly carried inside said front chamber, a take-up spool revolubly carried inside the rear chamber, both spools being of a large film-carrying capacity, a yielding roller revolubly carried by the magazine, when fitted on the camera, in substantial tangential engagement with the removable film-guiding roller in the camera, means whereby the control member on the camera drives, through the driving means and the pinion rigid with the coaxial pinion, the film from the feed spool to the take-up spool along a path registering with the view-taking gate of the camera and extending between the removable roller and the yielding roller cooperating therewith, a gearing system operatively connecting the take-up spool with the yielding roller, a cam revolubly carried by one of the flanges and adapted to hold the closing means of the front chamber in their operative condition, a hand-operable lever on the outside of the magazine controlling said cam, means whereby said cam, when shifted, away from its position holding the closing means, in a predetermined direction, locks the magazine doors and then releases the closing means for the front chamber enclosing the feed spool after said locking of the magazine doors.

7. In combination with a view-taking camera, chiefly a reflex camera, including a casing with open rear and lower surfaces, a view-taking gate registering with said rear surface, driving means located near the upper end of the rear open surface of the casing, and a control member for said driving means, the provision of a film-guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower inwardly part cylindrical and a rear upper cross-member connecting the corresponding ends of said flanges and a lower and a rear door rigidly secured each to the corresponding cross-member and adapted with said flanges and cross-members to enclose a light tight space forming underneath the camera two large chambers lying in substantially adjacent relationship, the front chamber being bounded by the part cylindrical inner surface of the front lower cross-member, a part cylindrical cover section pivotally connected along one edge with the cooperating edge of the first mentioned inner surface to form therewith a completely closed light tight chamber, a spring urging said cover outwardly against the cooperating lower door of the magazine to form a slot between its second edge and the cooperating generating line of the inner surface through which slot the film is adapted to pass out of the chamber, a feed spool revolubly carried inside said front chamber, a take-up spool revolubly carried inside the rear chamber, both spools being of a large film-carrying capacity, a yielding roller revolubly carried by the magazine, when fitted on the camera, in substantial tangential engagement with the removable film guiding roller in the camera, means whereby the control member on the camera drives, through the driving means and the pinion rigid with the coaxial pinion, the film from the feed spool to the take up spool along a path registering with the view-taking gate of the camera and extending between the removable roller and the yielding roller cooperating therewith, a cam revolubly carried by one of the flanges and adapted to hold the cover section for the front chamber in its operative condition, a hand-operable lever on the outside of the magazine controlling said cam, means whereby said cam, when shifted, away from its position holding the cover section, in a predetermined direction locks the magazine doors and then releases the cover for the front chamber enclosing the feed spool after said locking of the magazine door.

8. In combination with a view-taking camera, chiefly a reflex camera, including a casing with open rear and lower surfaces, a view-taking gate registering with said rear surface, driving means located near the upper end of the rear open surface of the casing, and a control chamber for said driving means, the provision of a film-guiding roller adapted to be removably fitted in the camera in operative relationship with the driving means in the latter; a pinion coaxially rigid with said roller and located laterally thereof, a magazine adapted to be fitted on the camera over the open rear and lower surfaces of the latter and including two lateral flanges, a front lower and rear upper cross-member connecting the corresponding ends of said flanges and a lower and a rear door rigidly secured each to the corresponding cross-member and adapted with said flanges and cross-members to enclose a light tight space forming underneath the camera two large chambers lying in substantially adjacent relationship, means adapted to close in a light tight manner the front chamber, a feed spool revolubly carried inside said front chamber, a take-up spool revolubly carried inside the rear chamber, both spools being of a large film-carrying capacity, a yielding roller revolubly carried by the magazine, when fitted on the camera, in substantial tangential engagement with the removable film-carrying capacity, means whereby the control member on the camera drives through the driving means and the pinion rigid with the coaxial pinion, the film from the feed spool to the take-up spool along a path registering with the view-taking gate of the camera and extending between the removable roller and the yielding roller cooperating therewith, safety means carried by one of the flanges and adapted to hold the closing means of the front chamber in their operative condition, a hand-operable lever on the outside of the magazine controlling said safety means, means whereby said safety means, when shifted, away from the position holding the closing means, in a predetermined direction lock the magazine doors and then release the closing means for the front chamber enclosing the feed spool after said locking of the magazine doors, and a footage indicator including two feeler arms, a spindle parallel with the location of the axis of the feed spool and revolubly carried by one of the magazine flanges to which the feeler arms are pivotally secured, a spring urging said feeler arms against the outer surface of the film wound over the feed spool, a lever rigid with each arm, a sector rigid with each lever mounted coaxially with said spindle, the two sectors having equal radii and moving angularly with reference to each other simultaneously with the angular shifting of the two feeler arms, one of said sectors being provided with a scale of lengths and the other sector being provided with a gate and a mark therein cooperating with the scale to provide a reading of the approximate length of the film section remaining on the feed spool, and means provided on one of the magazine flanges for examination of said gate, mark and scale.

9. In combiantion with a view-taking camera, chiefly a reflex camera, including a casing with open rear and lower surfaces, a view-taking gate registering with said rear surface, driving means located near the upper end of the rear open surface of the casing, and a control chamber for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and rear door rigidly secured each to the corresponding cross-member and adapted with said flanges and cross-members to enclose a light tight space forming underneath the camera two large chambers lying in substantially adjacent relationship, means adapted to close in a light tight manner the front chamber, a feed spool revolubly carried inside said front chamber, a take-up spool revolubly carried inside the rear chamber, both spools being of a large film-carrying capacity, a yielding roller revolubly carried by the magazine, when fitted on the camera, in substantial tangential engagement with the removable film-grinding roller in the camera, an incurved guiding cover carried by the magazine to coaxially surround the yielding roller over its upper part and the edge of which to the front of the yielding roller is concave to further the introduction, between it and the yielding roller, of the film unwinding from the feed spool to lead it over said yielding roller towards the take-up spool, means whereby the control member on the camera drives through the driving means and the pinion rigid with the coaxial pinion, the film from the feed spool to the take-up spool along a path registering with the view-taking gate of the camera and extending between the removable roller and the yielding roller cooperating therewith, a cam revolubly carried by one of the flanges and adapted to hold the closing means of the front chamber in their operative condition, a hand-operable lever on the outside of the magazine controlling said cam, means whereby said cam, when shifted, away from its position holding the closing means, in a predetermined direction locks the magazine doors and then releases the closing means for the front chamber enclosing the feed spool after said locking of the magazine doors.

10. In combination with a view-taking camera, chiefly a reflex camera, including a casing with open rear and lower surfaces, a view-taking gate registering with said rear surface, driving means located near the upper end of the rear open surface of the casing, and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and rear door rigidly secured each to the corresponding cross-member and adapted with said flanges and cross-members to enclose a light tight space forming underneath the camera two large chambers lying in substantially adjacent relationship, means adapted to close in a light tight manner the front chamber, a feed spool revolubly carried inside said front chamber, a take-up spool revolubly carried inside the rear chamber, both spools being of a large film-carrying capacity, a yielding roller revolubly carried by the magazine, when fitted on the camera, in substantial tangential engagement with the removable film-guiding roller in the camera, an incurved guiding cover carried by the magazine to coaxially surround the yielding roller over its upper part and the edge of which to the front of the yielding roller is concave to further the introduction, between it and the yielding roller, of the film unwinding from the feed spool to lead it over said yielding roller towards the take-up spool, two carriers for the ends of the guiding member pivotally secured to the corresponding magazine flanges and carrying revolubly the yielding roller, a releasable spring urging the unit constituted by the carriers, guiding-member and yielding roller towards the driving roller on the hand-operable camera, means for urging the yielding roller away from the camera for disengagement against the action of the last mentioned spring, means whereby the control member on the camera drives, through the driving means and the pinion rigid with the coaxial pinion, the film from the feed spool to the take-up spool along a path registering with the view taking gate of the camera and extending between the removable roller and the yielding roller cooperating therewith, a cam revolubly carried by one of the flanges and adapted to hold the closing means of the front chamber in their operative condition, a hand-operable lever on the outside of the magazine controlling said cam, means whereby said cam, when shifted, away from its position holding the closing means, in a predetermined direction locks the magazine doors and then releases the closing means for the front chamber enclosing the feed spool after said locking of the magazine doors.

11. In combination with a view-taking camera, chiefly a reflex camera including a casing with open rear and lower surfaces, a view taking gate registering with said rear surface, driving means located near the upper end of the rear open surface of the casing, and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and a rear door rigidly secured each to the corresponding cross-member and adapted with said flanges and cross-members to enclose a light tight space forming underneath the camera two large chambers lying in substantially adjacent relationship, means adapted to close in a light tight manner the front chamber, a feed spool revolubly carried inside said front chamber, a take-up spool rovolubly carried inside the rear chamber, both spools being of a large film-carrying capacity, a yielding roller revolubly carried by the magazine, when fitted on the camera, in substantial tangential engagement with the removable film guiding roller in the camera, a pinion coaxially rigid with the yielding roller and adapted to mesh with the first mentioned pinion to be controlled by the control member on the camera through the driving means and to drive the film from the feed spool to the take-up spool along a path registering with the view-taking gate of the camera and extending between the removable roller and the yielding roller cooperating therewith, a cam revolubly carried by one of the flanges in coaxial relationship with the location of the take up spool in the magazine, and adapted to hold the closing means of the front chamber in their operative condition, a hand-operable lever on the outside of the magazine controlling said cam, means whereby said cam, when shifted, away from its position holding the closing means, in a predetermined direction locks the magazine doors, and then releases the closing means for the front chamber enclosing the feed spool after said locking of the magazine doors.

12. In combination with a view-taking camera, chiefly a reflux camera, including a casing with open rear and lower surfaces, a view taking gate registering with said rear surface, driving means located near the upper end of the rear open surface of the casing, and a control member for said driving means, the provision of a film guiding roller adapted to be removably fitted in the camera in operative relationship with the driving means in the latter, a pinion coaxially rigid with said roller and located laterally thereof, a magazine adapted to be fitted on the camera over the open rear and lower surfaces of the latter and including two lateral flanges, a front lower and a rear upper cross-member connecting the corresponding ends of said flanges and a lower and a rear door rigidly secured each to the corresponding cross-member and adapted, with said flanges and cross-members, to enclose a light tight space forming underneath the camera two large chambers lying in substantially adjacent relationship, means adapted to close in a light tight manner the front chamber, a feed spool revolubly carried inside said front chamber, a take-up spool revolubly carried inside the rear chamber, both spools being of a large film-carrying capacity, a yielding roller revolubly carried by the magazine, when fitted on the camera, in substantial tangential engagement with the removable film-guiding roller in the camera, two carriers carrying revolubly the yielding roller, a releasable spring urging the unit constituted by the carriers and yielding roller towards the driving roller on the camera, a lever adapted to urge the yielding roller away from the camera for disengagement against the action of the last mentioned spring, a pinion coaxially rigid with the yielding roller and adapted to mesh with the first mentioned pinion to be controlled by the control member on the camera through the driving means and to drive the film from the feed spool to the take-up spool along a path registering with the view-taking gate of the camera and extending between the removable roller and the yielding roller cooperating therewith, the pinion rigid with the yielding roller disengaging the first mentioned pinion when said yielding roller is urged away from the camera, means for locking the doors of the magazine and means for operating the means closing in a light tight manner the front chamber.

13. In combination with a view-taking camera, chiefly a reflex camera including a casing with open rear and lower surfaces, a view-taking gate registering with said rear surface, driving means located near the upper end of the rear open surface of the casing, and a control member for said driving means, the provision of a film-guiding roller adapted to be removably fitted in the camera in operative relationship with the driving means in the latter, a pinion coaxially rigid wtih said roller and located laterally thereof, a magazine adapted to be fitted on the camera over the open rear and lower surfaces of the latter and including two lateral flanges, a front lower and a rear upper cross-member connecting the corresponding ends of said flanges and a lower and a rear door rigidly secured each to the corresponding cross-member and adapted with said flanges and cross-members to enclose a light tight space forming underneath the camera two large chambers lying in substantially adjacent relationship, a cover for the front chamber, means urging it into its open position, a feed spool revolubly carried inside said front chamber, a cylindrical holder carried inside the rear chamber adapted to open along a generating line, means controlling the opening of said cylindrical holder, a take-up spool revolubly carried inside the holder, both spools being of a large film-carrying capacity, a yielding roller revolubly carried by the magazine, when fitted on the camera, in front of the removable film-guiding roller in the camera, a pinion coaxially rigid with the yielding roller and adapted to mesh with the first mentioned pinion, means adapted to operatively connect the pinion rigid with the yielding roller with the take-up spool to make the film advance from the feed spool to the take-up spool, along a path registering with the view-taking gate of the camera and extending between the removable roller and the yielding roller cooperating therewith, a cam revolubly carried by one of the flanges in coaxial relationship with the location of the take up spool in the magazine, and adapted to hold the closing means of the front chamber in their operative conditions, a hand-operable lever on the outside of the magazine controlling said cam, means whereby said cam, when shifted, away from its position holding the closing means, in a predetermined direction, locks the magazine doors, and then releases the closing means for the front chamber enclosing the feed spool after said locking of the magazine doors and means whereby said cam controls the means controlling the opening of the cylindrical holder.

References Cited in the file of this patent

UNITED STATES PATENTS

| | | |
|---|---|---|
| 1,036,385 | Vale | Aug. 20, 1912 |
| 1,389,164 | Roikjer | Aug. 30, 1921 |
| 1,527,476 | Gianetto | Feb. 24, 1925 |
| 2,080,086 | Mihalyi | May 11, 1937 |
| 2,150,106 | Roessel | Mar. 7, 1939 |
| 2,575,024 | Mihalyi | Nov. 13, 1951 |

FOREIGN PATENTS

| | | |
|---|---|---|
| 946,641 | France | Dec. 27, 1948 |